United States Patent
Harper et al.

(10) Patent No.: US 9,936,253 B2
(45) Date of Patent: Apr. 3, 2018

(54) USER-SELECTED MEDIA CONTENT BLOCKING

(71) Applicant: EchoStar Technologies L.L.C., Englewood, CO (US)

(72) Inventors: Leslie Harper, Highlands Ranch, CO (US); John A. Card, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 66 days.

(21) Appl. No.: 15/250,502

(22) Filed: Aug. 29, 2016

(65) Prior Publication Data

US 2016/0381422 A1 Dec. 29, 2016

Related U.S. Application Data

(63) Continuation of application No. 13/917,912, filed on Jun. 14, 2013, now Pat. No. 9,432,424, which is a
(Continued)

(51) Int. Cl.
*G06F 3/048* (2013.01)
*H04N 21/454* (2011.01)
(Continued)

(52) U.S. Cl.
CPC ......... *H04N 21/4542* (2013.01); *G06Q 30/02* (2013.01); *H04L 65/4076* (2013.01);
(Continued)

(58) Field of Classification Search
CPC ......... H04N 21/4542; H04N 21/23418; H04N 21/2668; H04N 21/4661; H04N 21/812;
(Continued)

(56) References Cited

U.S. PATENT DOCUMENTS 6,243,676 B1 6/2001 Witteman
7,889,964 B1 2/2011 Barton et al.
(Continued)

FOREIGN PATENT DOCUMENTS

GB 2370946 7/2002
GB 2391683 2/2004
(Continued)

OTHER PUBLICATIONS

Casagrande, Steven et al., U.S. Appl. No. 61/140,786, filed Dec. 24, 2008, 67 pages.
(Continued)

*Primary Examiner* — David Phantana-angkool
(74) *Attorney, Agent, or Firm* — Lowe Graham Jones PLLC

(57) ABSTRACT

Presented herein is a method of blocking user-selected media content, such as, for example, audio and/or video content. In the method, at least one media content stream is presented to a user, wherein the at least one media content stream includes multiple showings of an identifiable contiguous segment of media content. One example of such a segment may be a commercial or advertisement. While presenting a current showing of the segment of media content to the user, a command is received from a user to block the segment of media content from presentation to the user. In response to receiving the command, information identifying the segment of media content is generated. The at least one media content stream is analyzed using the information to detect subsequent showings of the segment of media content. Presentation of at least one of the subsequent showings of the segment of media content is prevented when detected in the at least one media content stream.

19 Claims, 8 Drawing Sheets

Related U.S. Application Data continuation of application No. 12/855,676, filed on Aug. 12, 2010, now Pat. No. 8,468,453.

(51) Int. Cl.
*G06Q 30/02* (2012.01)
*H04N 21/2668* (2011.01)
*H04N 21/466* (2011.01)
*H04L 29/06* (2006.01)
*H04N 21/234* (2011.01)
*H04N 21/81* (2011.01)

(52) U.S. Cl.
CPC ............ *H04L 65/60* (2013.01); *H04L 65/602* (2013.01); *H04N 21/23418* (2013.01); *H04N 21/2668* (2013.01); *H04N 21/4661* (2013.01); *H04N 21/812* (2013.01)

(58) Field of Classification Search
CPC ..... G06Q 30/02; H04L 65/4076; H04L 65/60; H04L 65/602
USPC ......................................................... 715/736
See application file for complete search history.

(56) References Cited

U.S. PATENT DOCUMENTS

| | | | | |
|---|---|---|---|---|
| 7,890,985 | B2* | 2/2011 | Bowra | H04L 65/602 386/217 |
| 8,260,794 | B2 | 9/2012 | Caceres | |
| 8,275,898 | B2 | 9/2012 | Pickens et al. | |
| 8,387,150 | B2 | 2/2013 | Schnell | |
| 8,973,075 | B1* | 3/2015 | Willis | H04N 21/2353 348/14.13 |
| 9,756,373 | B2* | 9/2017 | Houston | H04N 21/2665 |
| 2007/0199013 | A1 | 8/2007 | Samari et al. | |
| 2007/0300249 | A1 | 12/2007 | Smith et al. | |
| 2007/0300250 | A1* | 12/2007 | Smith | H04H 20/31 725/20 |
| 2008/0313742 | A1 | 12/2008 | Qi et al. | |
| 2009/0031007 | A1* | 1/2009 | Boic | G06F 17/30053 709/219 |
| 2009/0133092 | A1 | 5/2009 | Casagrande | |
| 2010/0158484 | A1 | 6/2010 | Casagrande et al. | |
| 2010/0162291 | A1 | 6/2010 | Casagrande et al. | |
| 2010/0162344 | A1 | 6/2010 | Casagrande et al. | |
| 2011/0295668 | A1 | 12/2011 | Charania et al. | |
| 2011/0296045 | A1* | 12/2011 | Todd | H04L 43/0852 709/231 |
| 2011/0321095 | A1* | 12/2011 | Yao | H04N 21/235 725/41 |
| 2012/0311625 | A1 | 12/2012 | Nandi | |
| 2013/0283173 | A1* | 10/2013 | Harper | G06Q 30/02 715/734 |
| 2014/0259046 | A1 | 9/2014 | Ren et al. | |
| 2015/0067717 | A1 | 3/2015 | Oliver | |
| 2015/0070516 | A1 | 3/2015 | Shoemake et al. | |

FOREIGN PATENT DOCUMENTS

| | | |
|---|---|---|
| WO | 2006031202 | 3/2006 |
| WO | 2008112808 | 9/2008 |

OTHER PUBLICATIONS

Casagrande, Steven et al., U.S. Appl. No. 61/140,786, filed Dec. 24, 2008, 64 pages.
Casagrande, Steven et al., U.S. Appl. No. 61/140,783, filed Dec. 24, 2008, 65 pages.

* cited by examiner

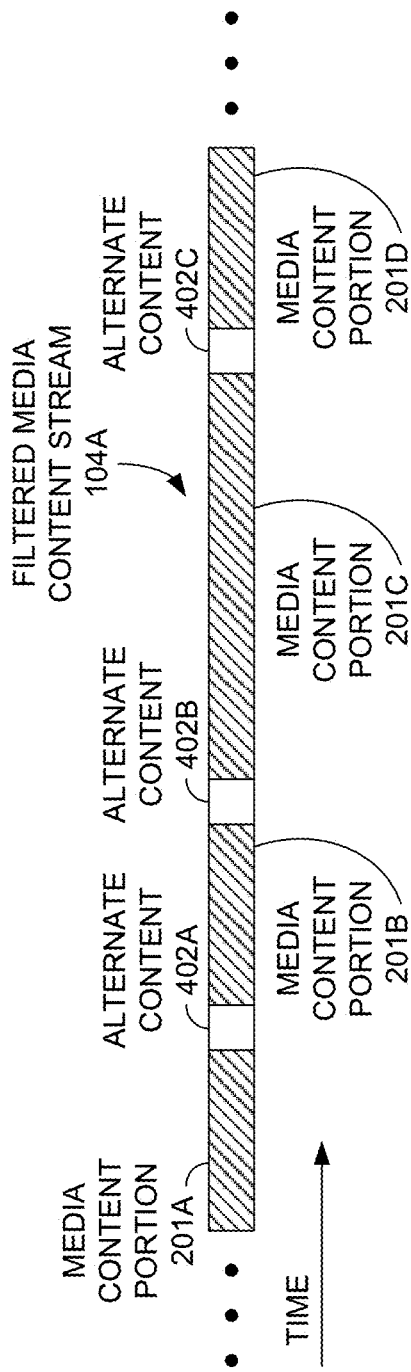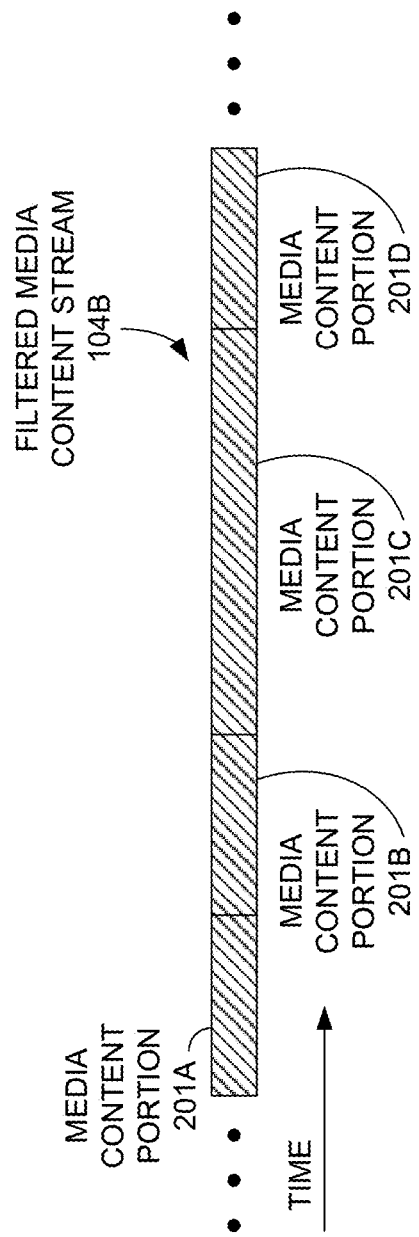

USER-SELECTED MEDIA CONTENT BLOCKING

PRIORITY CLAIM

This patent application is a Continuation of U.S. Non-Provisional patent application Ser. No. 13/917,912, filed Jun. 14, 2013, published as U.S. Publication No. 2013/0283173, entitled "USER-SELECTED MEDIA CONTENT BLOCKING," and issued as U.S. Pat. No. 9,432,424 on Aug. 30, 2016, which is a Continuation of U.S. Non-Provisional patent application Ser. No. 12/855,676, filed Aug. 12, 2010, published as U.S. Publication No. 2012/0042247, entitled "USER-SELECTED MEDIA CONTENT BLOCKING," and issued as U.S. Pat. No. 8,468,453 on Jun. 18, 2013, the content of which are herein incorporated by reference in their entirety.

BACKGROUND

Nearly all commercial broadcast radio and television channels present programs, such as movies, entertainment series episodes, news programs, sporting events, and the like, separated by, and possibly interspersed with, short advertisements or commercial messages that are presented to the user multiples times over a period of days, weeks, or months. Such is often true even of non-broadcast premium or subscriber-only channels, which present promotional advertising of upcoming programming to be presented on the channel. While a user may specifically choose the programs they wish to view, the user typically has no control over the commercials or advertisements shown during their desired programs. At the least, some of the commercials may be of little interest to the user. Worse, the user may find some advertisements annoying or even offensive in terms of the subject matter being presented, or in the manner in which the information is presented, such as by way of faster video edits, louder audio in selected frequency ranges, and so on.

In the case of television commercials, the user may mute the audio portion of an undesirable advertisement, using the video portion of the commercial to determine when the advertisement has ended so that the audio portion may be restored. However, such a process leaves the video portion of the commercial visible to the user. In another case, the user may switch broadcast channels when an unwanted commercial is shown to avoid both the audio and video portions of the advertisement. However, in so doing, the user may not be aware of when presentation of the commercial is complete, thus either returning to the original channel too soon to see the remainder of the commercial, or too late to miss the resumption of the desired program being viewed. Further, the alternate channel to which the user has tuned may be carrying an even more undesirable programming segment, such as another commercial or an undesired feature presentation, at that time.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

FIG. 4A is a graphical depiction of a filtered media content stream in which showings of a particular segment of media content are replaced with alternate content according to an embodiment of the invention.

FIG. 4B is a graphical depiction of a filtered media content stream in which showings of a particular segment of media content are eliminated from the media content stream according to an embodiment of the invention.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
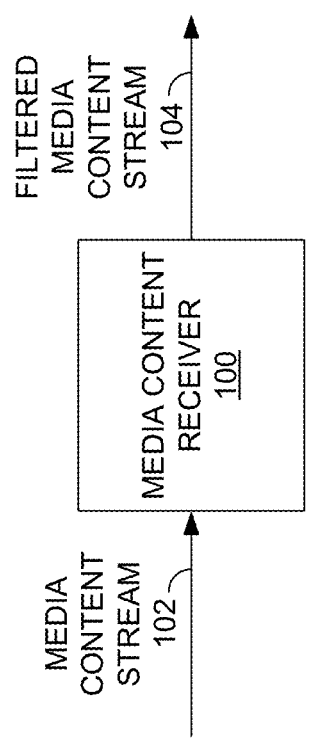
FIG. 1 is a simplified block diagram of a media content receiver according to an embodiment of the invention.

FIG. 1 is a block diagram of a media content receiver 100 receiving a media content stream 102. One example of the media content stream 102 is television programming carried over a satellite, cable, or terrestrial ("over-the-air") broadcast channel. Another example may be audio programming carried over a satellite, cable, or terrestrial radio channel or frequency. More generally, any stream of audio and/or visual programming or content transferred over a communications channel, including wired and wireless communication networks, such as the Internet or other wide-area network (WAN), local-area network (LAN), and mobile communications network, may serve as the media content stream 102.

Accordingly, the media content receiver 100 may be any device configured to receive and process the media content stream 102 for presentation to a user or viewer. Examples of the media content receiver 100 include, but are not limited to, satellite, cable, and terrestrial television receivers or set-top boxes, televisions, satellite, and terrestrial radio receivers, digital video recorder (DVR) units, desktop and laptop computers, and mobile communication devices, such as cellular phones, personal digital assistants (PDAs), and so on. The media content receiver 100 may include an output device, such as a visual display and/or audio-generating hardware, for presenting media content to a user, or may be configured to communicate with such components for presentation purposes.

As shown in FIG. 1, the media content receiver 100 is configured to receive and process the media content stream 102 to produce a filtered media content stream 104 for presentation to a user. A graphical representation of an example of the media content stream 102 is presented in FIG. 2. The media content stream 102 includes a number of showings 202A, 202B, 202C of a particular identifiable contiguous media content segment 202 that is selected by a user to be blocked or prevented from presentation. The various showings of the segment 202 are separated by various portions 201A, 201B, 201C, 201D of the media content stream 102. If the media content stream 102 is a stream of television programming provided on a broadcast channel, the selected media content segment 202 may be a television commercial or advertisement to be blocked or prevented from presentation, while the intervening portions 201 constitute other television content to be presented to the user, such as television programming, other television commercials, and the like. While the examples discussed below make reference to the media content segment 202 as a commercial or advertisement, other types of identifiable media content segments 202, such as entire movies or programs, or identifiable sections thereof, such as opening or closing credits, may also be filtered or blocked from presentation in other implementations.

Figure 2:
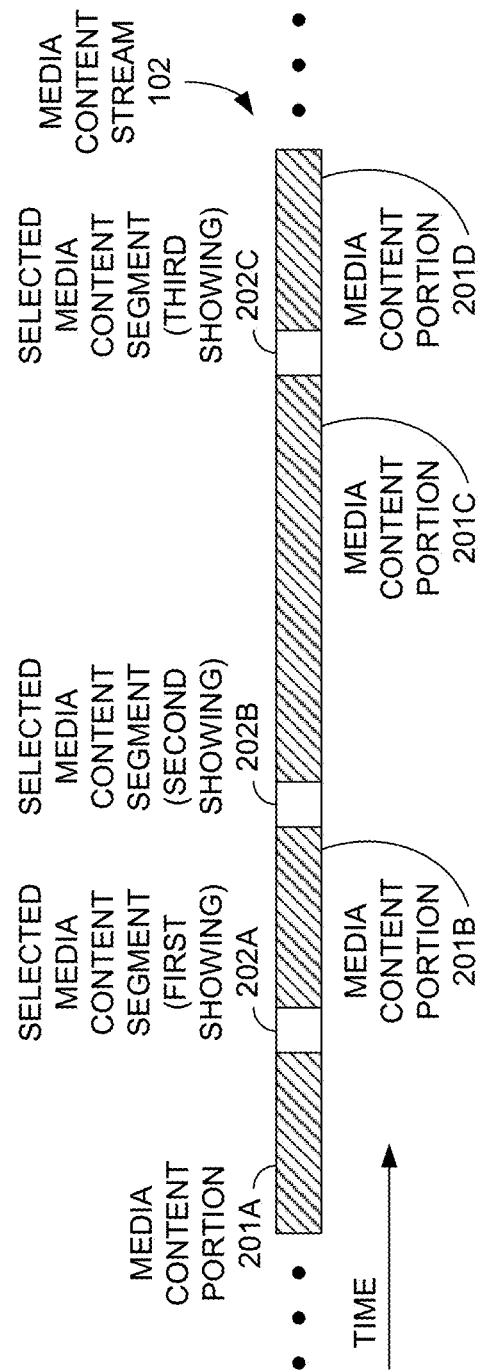
FIG. 2 is a graphical depiction of a media content stream including multiple showings of a specific media content segment according to an embodiment of the invention.
Figure 3:
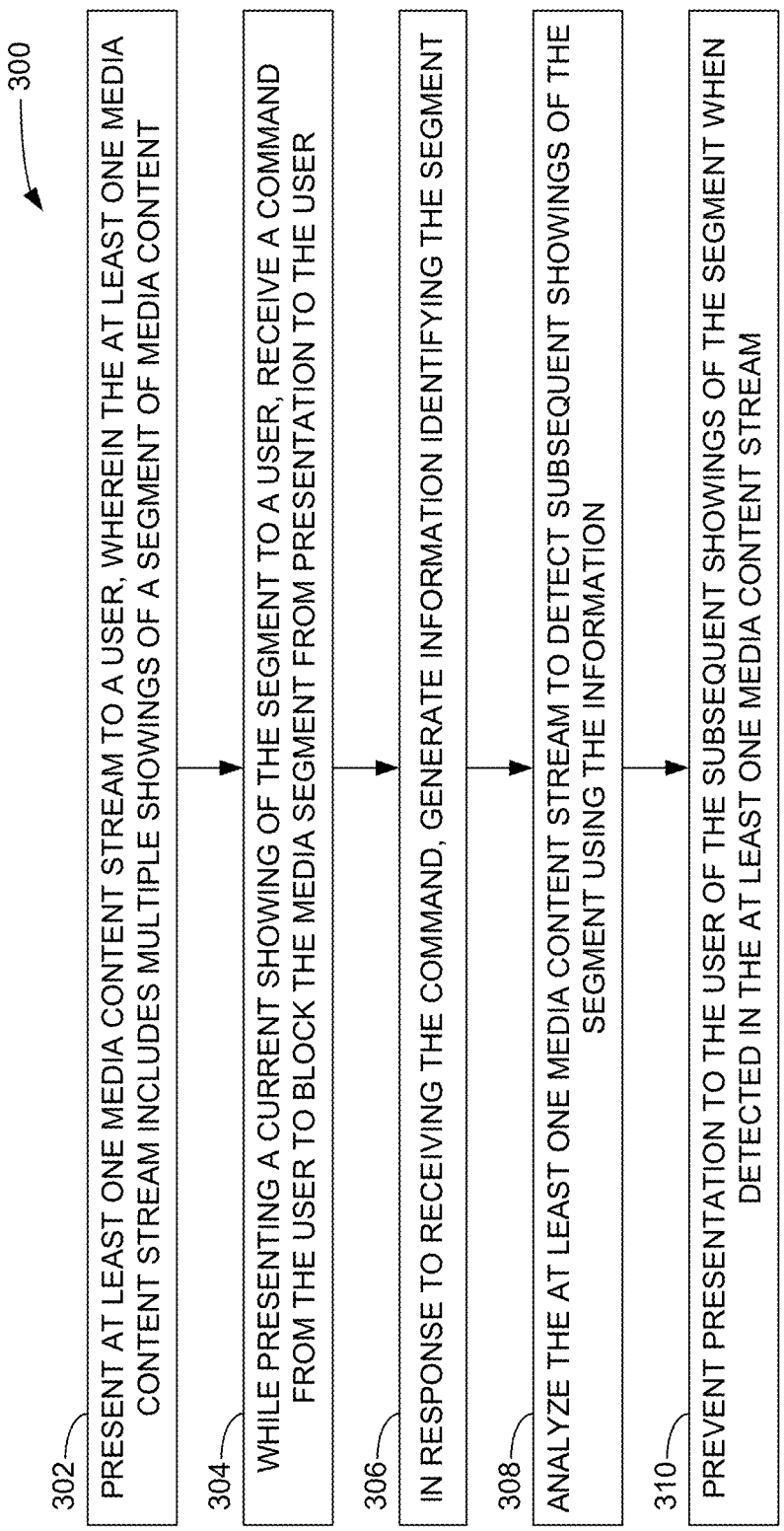
FIG. 3 is a flow diagram of a method according to an embodiment of the invention of blocking user-selected media content.

FIG. 3 presents a method 300 of blocking user-selected media content according to an embodiment of the invention. Using FIGS. 1 and 2 for reference, in the method 300 at least one media content stream 102 is presented to a user (operation 302). As shown in FIG. 2, the at least one media content stream 102 includes multiple showings 202A, 202B, 202C of a segment 202 of media content. While presenting a current showing 202A of the media content segment 202 to the user, a command is received from the user to block the media content segment 202 from presentation to the user (operation 304). In response to receiving the command, information identifying the media content segment 202 is generated (operation 306). The at least one media content stream 102 is analyzed to detect subsequent showings 202B, 202C of the media content segment 202 using the information (operation 308). Presentation to the user of at least one of the subsequent showings 202B, 202C of the media content segment 202 is prevented when detected in the at least one media content stream 102 (operation 310). In some implementations, the remainder of the initial showing 202A occurring after reception of the command may also be blocked or prevented from presentation.

While the operations of FIG. 3 are depicted as being executed in a particular order, other orders of execution, including concurrent or overlapping execution of two or more implied or explicit operations, may be possible. In another embodiment, a computer-readable storage medium may have encoded thereon instructions for a processor or other control circuitry of the media content receiver 100 of FIG. 1, or a similar receiving device, to implement the method 300.

As a result of employing the method 300, subsequent showings of a user-selected identifiable segment of media content, such as a commercial or advertisement, may be blocked based on input received from a user while a current showing of the segment is being presented. Thus, if a user finds a currently-presented media content segment objectionable, the user may merely provide some indication to the media content receiver, which then operates to detect and block subsequent showings of the segment based on information that may be used to identify the segment in the media content stream. Additional advantages may be recognized from the various implementations of the invention discussed in greater detail below.

FIGS. 4A and 4B provide graphical representations of two possible examples of the filtered media content stream 104 of FIG. 1. In FIG. 4A, each showing 202A, 202B, 202C of the selected media content segment 202 is replaced by alternate content 402A, 402B, 402C in the filtered media content stream 104A. In other implementations, less than all of the showings 202A, 202B, 202C are replaced by alternate content 402, under control of the user. For example, the user may be able to allow the presentation of the selected media content segment 202 some predetermined number of times per day. As is described in greater detail below, such content may be content provided via a separate broadcast channel received by the media content receiver 100, via a separate communication path or link, or may be supplied from within the receiver 100. Use of the alternate content 402 may allow the media content portions 201 between the original selected segments 202 to continue to be presented as originally received relative to each other in time. Such an implementation is useful in cases in which the filtered content stream 104 is presented to the user with little or no delay while the media content stream 102 is being received.

In the example of FIG. 4B, in filtered media content 104B, each showing 202A, 202B, 202C of the selected media content segment 202 may be removed from the stream 104B, essentially allowing the intervening media content portions 201A, 201B, 201C, 201D to be presented back-to-back, essentially compressing the presentation time of the overall filtered media content stream 104B. Such an implementation may be possible if a sufficient amount of the received media content stream 102 is buffered or stored within the media content receiver 100, such as in a receiver that provides digital video recorded (DVR) functionality. In that case, alternate content to replace the selected segment showings 202 is not required but may be used. In other implementations, the media content portions 201 may be separated by visual darkness and/or audio silence for some short period of time, such as one or two seconds, to provide some separation between the various content portions 201 being presented to the user. In addition, each showing 202 of the selected segment may be preserved or deleted in the stored portion of the filtered stream 104B, or the showings 202 may be edited out as the filtered stream 104B is presented to the user.

Figure 5:
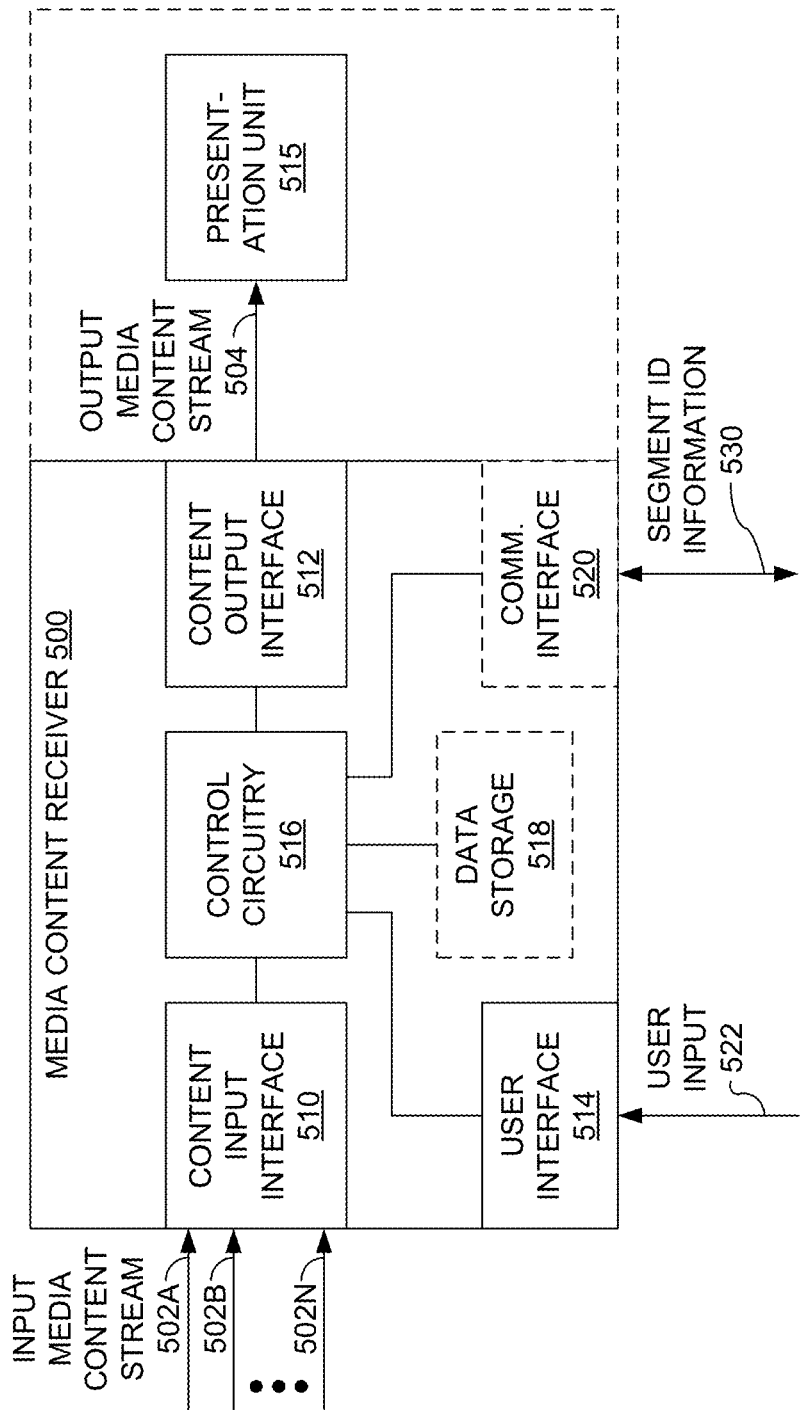
FIG. 5 is a block diagram of a media content receiver according to an embodiment of the invention.

FIG. 5 is a block diagram of a media content receiver 500 according to one embodiment of the invention. As with the media content receiver 100 of FIG. 1, the media content receiver 500 of FIG. 5 may be a satellite television programming receiver, although various other types of receivers, such as cable and terrestrial television receivers, radio broadcast receivers, mobile communication devices, and computers, may serve as the media content receiver 500. As shown in FIG. 5, the media content receiver 500 includes a content input interface 510, a content output interface 512, a user interface 514, and control circuitry 516. The media content receiver 500 may also include data storage 518 and a communication interface 520 in some implementations. Further, the media content receiver 500 may incorporate a presentation unit 515 for presenting media content to a user, or may be coupled to such a device. Other components, such as a power supply or a "smart card" removable memory device interface, may also be included in the media content receiver 500, but are not described further herein to simplify and focus the following discussion. Other devices, such as a satellite or terrestrial antenna and associated signal conversion circuitry, may be coupled with the receiver 500 to receive the media content streams described below, but such devices are not discussed in detail hereinafter.

The content input interface 510 receives one or more media content streams 502A-502N, such as broadcast television programming streams received via separate programming channels. In the case of a satellite television receiver, the content input interface 510 receives the content 502 via an antenna/LNB combination that receives, down-converts, and forwards the content 502 to the content input interface 510, typically via a coaxial cable. The content input interface 510 may include one or more tuners for selecting particular programming channels carrying the incoming content streams 502 for forwarding via the content output interface 512 to the presentation unit 515, such as a television, video monitor, and/or audio amplifier with speakers. The content input interface 510 may also perform any decryption, decoding, and similar processing of the received content streams 502 required to place the content streams 502 in a format usable by the content output interface 512. In one example, the video may be formatted according to one of the Motion Picture Experts Group (MPEG) formats, such as MPEG-2 or MPEG-4, while the audio may be formatted according to MPEG or Dolby Digital 5.1 (also referred to as AC-3). Other audio/video content format standards may be utilized in other embodiments.

The content output interface 512 provides at least one of the media content streams 502 as a filtered output media content stream 504 to the television or other presentation unit 515 connected thereto. To that end, the content output interface 512 may encode the output media content 504 in accordance with one or more output formats. For example, the content output interface 512 may format the output media content stream 504 for one or more of an analog composite or component video connection with associated audio connection, a modulated radio frequency (RF) connection, and a High Definition Multimedia Interface (HDMI) connection. Other possibilities for the content output interface 512 include, but are not limited to, Ethernet and Universal Serial Bus (USB).

To allow a user to control various functions and aspects of the receiver 500, including the selection of programming channels for viewing, as well as the selection of a content segment to be blocked or removed, the user interface 514 receives user input 522 for such purposes. In many examples, the user interface 514 may be a remote control interface configured to receive the user input 522 by way of infrared (IR), radio frequency (RF), acoustic, or other wireless signal technologies. To facilitate such information entry, the receiver 500 may provide a menu system or other on-screen display system presented to the user via the presentation unit 515. In some implementations, the user interface 514 may also include any of a keyboard, mouse, and/or other user input device.

The data storage 518, if included, is configured to store at least a portion of one or more of the media content streams 502 for delayed playback via the content output interface 512 to the presentation unit 515. Thus, the data storage 518 may operate as a DVR unit incorporated in the receiver 500, or may provide a time delay between reception of the media content streams 502 and delivery of the associated output media content stream 504 to the presentation unit 515. Other information, such as electronic program guide (EPG) information and information identifying segments of the input media content stream 502 for filtering thereof, may also be included in the data storage 518. The data storage 518 may include volatile memory, such as static and/or dynamic random-access memory (RAM), and/or nonvolatile memory, such as read-only memory (ROM), flash memory, and magnetic or optical disk memory.

The control circuitry 516 is configured to control and/or access other components of the media content receiver 500. The control circuitry 516 may include one or more processors, such as a microprocessor, microcontroller, or digital signal processor (DSP), configured to execute instructions directing the processor to perform the functions discussed more fully hereinafter, such as the generation of information identified with a user-selected segment of an input media content stream 502, detection of a subsequent showing of the segment, and the like. The control circuitry 516 may also include memory or data storage adapted to contain such instructions, or may utilize the data storage 518 for that purpose. The memory may also include other data to aid the control circuitry 516 in performing the tasks more particularly described below. In another implementation, the control circuitry 516 may be strictly hardware-based logic, or may include a combination of hardware, firmware, and/or software elements.

In some implementations, the media content receiver 500 may include a communication interface 520 configured to transmit or receive segment identification information 530 associated with a user-selected segment to be blocked or prevented from presentation with another receiver 500 or with a separate communication node, as is described more fully below. The communication interface 520 may employ any of a number of communication technologies for transmission and reception of the segment identification information 530, including both wired and wireless varieties. For example, the communication interface 520 may be an Ethernet, Wi-Fi (IEEE 802.11x), Bluetooth®, or HomePlug® interface for connecting with an Internet gateway device, or with another receiver 500 located nearby. In another implementation, the communication interface 520 may employ a direct connection to a broadband connection for receiving and transmitting the information 530 via the Internet.

In operation, the control circuitry 516 of the media content receiver 500 is configured to present at least one of the media content streams 502 received via the content input interface 510 to the content output interface 512 for presentation to the user via the presentation unit 515. In one example, the user has selected which of the media contents streams 502 are to be presented via user input 522 received at the user interface 514. In some implementations, more than one of the streams 502 may be presented to the user concurrently, such as in a picture-in-picture (PIP) mode.

In the examples to follow, the input media content stream 502 generally includes both video data and audio data, possibly along with some text data and/or other "metadata", which may describe various aspects of, or provide additional information regarding, the input stream 502. The video data may include an ongoing series of still video images, or "frames", that provide a moving image when presented in sequence. Furthermore, the frames may be presented in an uncompressed format, or in a compressed format, such as one of the MPEG formats, including MPEG-2 or MPEG-4. Similarly, the audio data may include a series of audio samples for presentation to the user in sequence.

While presenting a media content stream 502 to the user via the presentation unit 515 as the output media content stream 504, the user may employ the user interface 514 to provide a user input 522 command indicating that subsequent showings of an identifiable contiguous segment of the output media content stream 504 currently being presented are to be blocked from presentation. In some cases, the segment may be a television or radio commercial or advertisement, although other types of media content segments may be selected for blocking. The user may enter the command or selection by way of a specific button or key on a remote control device, by way of a menu item selection, or via some other input means.

In response to the user command, the control circuitry 516 generates information identifying the selected segment of the media content stream 502. Several attributes of the media content stream 502 may be employed for such a purpose. In one example, the media content stream 502 may include metadata which associates the segment with a unique identifier. More specifically, the unique identifier may be present in the metadata of the input media content stream 502 for the duration of the segment. As a result, the identifier may be employed to detect both the beginning and end of each showing of the selected segment. Additionally, the control circuitry 516 may employ the identifier as segment identification information 530 to detect the beginning and end of each subsequent segment for blocking purposes. In one implementation, the identifier may be a globally-unique identifier (GUID) assigned to each possible content segment by way of a producer of the segment, by the media content service provider delivering the segment to the receiver 500, or another entity. Such an identifier may be transmitted periodically throughout the segment so that accurate identification of the beginning and end of the segment within the input content stream 502 is possible. Thus, by analyzing the input content stream 502 on a continuing basis, the control circuitry 516 may detect any subsequent showings of the user-selected content segment and prevent the presentation thereof via the content output interface 512.

In many cases, however, metadata specifically identifying the segment and its beginning and end may not be available in the input content stream 502. Accordingly, the control circuitry 516 may instead employ other forms of metadata, as well as attributes or characteristics of the video and/or audio data present in the input content stream 502. For example, one type of data often presented during commercials and other segments of the input content stream 502 may be closed captioning data provided primarily for viewers with hearing challenges. Examples of closed captioning data accompanying video and audio data for a media content stream 502 include data formatted according to the EIA-608 standard for NTSC (National Television System Committee) broadcasts and the EIA-708 standard for ATSC (Advanced Television Systems Committee) transmissions. In some implementations, the captioning data may be received over the same channel or stream 502 over which the associated or related audio and video data are received. In other examples, the captioning data associated with the audio/video data may be received over a separate channel, or by way of a separate input connection, such as the communication interface 520.

For example, upon user selection of the current content segment, the control circuitry 516 may peruse the closed captioning data of the input content stream 502 to find a unique word or phrase to be associated with the segment, or a mathematical hash, such as MD5 (Message-Digest algorithm 5), calculated from that data. The control circuitry 516 may search the closed captioning data in the content stream 502 immediately after the receipt of the user selection command. Additionally, if the input content stream 402 is being buffered in the data storage 518, the control circuitry 516 may also search closed captioning data associated with content 502 that was presented prior to receipt of the user selection.

Once the control circuitry 516 determines a unique word or phrase from the closed captioning data, the control circuitry 516 generates segment identification information 530 indicating the unique text that identifies the media content segment to be blocked. In one implementation, the identification information 530 includes the unique text. The information 530 may also include indications of the beginning and end of the selected segment relative to the location or timestamp associated with the unique text. For example, the start of the segment may be designated by an implicit, explicit, or calculated time value or number of frames preceding the unique text when the closed captioning containing the text appears in the media content stream 502. Similarly, the end of the segment may be indicated via a time value or number of frames following the unique text in the stream 502.

To generate the information 530 indicating the start and end of the segment 502, the control circuitry 516 may employ data other than the closed captioning metadata to determine the start and end points of the segment in the stream 502. In one implementation, the user may indicate via additional user input 522 the beginning and end of the segment to be blocked. For example, presuming the receiver 500 employs time-shifting functionality via its data storage 518, the user may rewind presentation of the segment to its beginning, mark the current location as the start of the segment, then navigate to the end of the segment and mark that location as such. In response, the control circuitry 516 may employ these user inputs to generate data indicating the beginning and end of the segment relative to the unique text employed to identify future showings of the segment.

In another example, the control circuitry 516 may analyze the video data both before and after the point in the stream 502 at which the unique text is to be presented. For example, the control circuitry 516 may analyze the video data for a short series of dark video frames, which may indicate transitions between the selected segment and the remainder of the media content stream 502. Further, the control circuitry 516 may use knowledge regarding the nature of the selected segment to determine or calculate how many frames or seconds separate the beginning and end of the segment. In the case of a television commercial, the control circuitry 516 may utilize the fact that most commercials are fifteen seconds, thirty seconds, or sixty seconds in length. As a result, if the control circuitry 516 discovers two series of dark frames thirty seconds apart and located both before and after the unique text, the control circuitry 516 may designate the location of the two dark frame series as the start and end of the selected segment.

In another embodiment, the control circuitry 516 may analyze other aspects of the video data in the neighborhood of the unique text, drawing upon other attributes of the video associated with the type of segment being selected. For instance, for the blocking of commercials and advertisements, the control circuitry 516 may inspect the stream 502 for changes in video resolution, such as changes between standard definition and high definition content, to detect the beginning and end of a commercial selected for blocking.

In another example, the control circuitry 516 may inspect color tables transmitted periodically as part of the input video content stream 502 to detect significant changes in the tables. Generally, in compressed video data, the color tables provide a mapping from one set of colors to a smaller data set that facilitates compression of the video data. Further, a color table may be provided periodically in the media content stream 502 to reflect changes in the overall color scheme of the stream 502. In many cases, a commercial will provide a significantly different and consistent set of color tables than what is provided both before and after the commercial in the media content stream 502. The control circuitry 516 may interpret transitions between different sets of color tables close to the unique text as the beginning and end of the user-selected segment.

Similarly, the control circuitry 516 may employ the audio portion of the media content stream 502 to ascertain the beginning and end of the selected segment. With respect to commercials, the control circuitry 516 may search for audio samples representing audio silence, which, like short series of dark frames, is typical for short periods of time preceding and following commercials. If a group of silent samples is located in the stream 502 preceding the user-selected segment, and another group is detected following the segment, the control circuitry 516 may presume those audio sample groups are located at the beginning and end of the segment. Further, if the sample groups are separated by some standard length of time commensurate with commercial duration, such as fifteen or thirty seconds, the control circuitry 516 may possess more confidence that the two sample groups delineate the user-selected segment.

As with video, the format of the audio sample information may change significantly when transitioning from program to commercial, and vice-versa. For example, while much programming may be presented in an advanced audio format, such as Dolby Digital 5.1, many commercials may utilize two-channel stereo audio. The control circuitry 516 may interpret these changes in audio attributes as transitions between the user-selected segment and the remainder of the media content stream 502.

The control circuitry 516 may exploit other differences in audio between the type of segment the user has selected for blocking and the surrounding portions of the media content 502 to determine the extent of the segment. In one example, television commercials and advertisements often exhibit a restricted frequency range that includes stronger mid-range frequency content and less low-frequency and high-frequency content than other forms of media content. The control circuitry 516 can utilize such information to determine when the user-selected segment begins and ends. In other cases, commercials may employ an overall higher volume level than other content proximate to the commercial segment in the media content stream 502, allowing the control circuitry 516 another way of distinguishing between the segment and the surrounding content.

To help ensure that the beginning and end of the segment are correctly identified, the control circuitry 516 may also compare the audio or video data being used to determine the extent of the segment with similar data corresponding to the point in the segment identified with the unique text of the segment. For example, if the audio formatting at the ends indicates that the segment is recorded in two-channel stereo audio, the audio formatting of the segment at the point of the unique closed captioning text should also be in two-channel format. Other video and audio data or attributes associated with the segment, such as video format, audio frequency range, and the like, may be employed in like manner.

In yet other embodiments, some of the audio and video information and attributes described above may be employed not only to determine the start and end of the selected segment, but as information identifying the segment. For example, one or more samples of video color tables provided during the segment may be of sufficient uniqueness to distinguish the segment from other portions of the media content stream 502. Similarly, certain video frames or sequences thereof may be of such a unique character to allow identification of the segment within the stream 502. Unique audio frames or sequences thereof, audio frequency ranges, and other audio attributes may be employed to identify the user-selected segment instead of closed captioning text or other metadata.

Any of the audio data, video data, and metadata described above may be included as the segment identification information 530 generated by the control circuitry 516. As indicated above, the control circuitry 516 may then employ this data to detect subsequent showings of the same segment of media content in any of the media contents streams 502 being presented to the user via the content output interface 512. Further, the control circuitry 516 may employ and assign different statistical weights to any combination of the different types of video data, audio data, and metadata discussed above to both identify the segment, and to define the start and end points thereof, for detecting and blocking future showings of the segment.

In some cases, to ensure that a particular portion of the media content stream 502 remains available for analysis by the control circuitry 516 for generation of the segment identification information 530 after the user selection is received, a sufficient amount of the media content stream 502 may remain in the data storage 518 for some period of time to allow analysis of portions of the stream 502 that have already been presented to the user. For example, when the user selects the current segment for subsequent blocking, storing a sufficient amount of the media content stream 502 to include the start of the segment may allow the control circuitry 516 to determine the starting point of the segment.

Similarly, in scenarios in which any unique data, as may be found in the video data, audio data, and/or metadata, for identifying the segment is not located at or proximate to the beginning of the segment, the control circuitry 516 may employ the data storage 518 as a buffer for delaying presentation of the stream 502 to the user after reception via the content input interface 510. More specifically, if the control circuitry 516 buffers the content stream 502 for at least as long as is required to receive and analyze the content stream 502 in order to identify the user-selected segment before the beginning of the segment is presented to the user, then the control circuitry 516 may prevent presentation of the entire segment. Otherwise, some portion of the beginning of the segment may be presented to the user prior to determining that the user-selected segment has been encountered in the input content stream 502.

In addition to preventing presentation of subsequent showings of the user-selected segment, in some implementations the control circuitry 516 is configured to block the remainder of the current showing of the user-selected segment upon receipt of the user command selecting the current segment for blocking. In such cases, the control circuitry 516 is also adapted to resume presentation of the media content stream 502 once the end of the user-selected segment has been detected, as is described above.

When all or a portion of the user-selected segment is blocked, the control circuitry 516 may provide alternate audio and/or visual content during that time, such as the alternate content 402 depicted in FIG. 4A. While presentation of a dark screen and audio silence during the blocking period is possible, other forms of alternate content may be desired. For example, while a segment is being blocked, the control circuitry 516 may provide an information screen, such as a "pop-up" screen, informing the current viewer that the current video content has been blocked in accordance with a user preference. In addition, the control circuitry 516 may provide instructions on how the user may provide user input 522 to allow the content to be presented, either for the current showing only or for future showings as well.

In lieu of, or in addition to, the pop-up screen, the control circuitry 516 may provide alternate video content that is either pre-stored in the data storage 518 or available via another of the input media content streams 502. For example, the alternate video content may include a "screen saver" or other type of pre-stored content that does not have a predetermined presentation time so that the alternate content may be employed for a user-selected segment of any time duration. In another implementation, the alternate visual content may be a "barker" or promotional channel providing information about upcoming programming available via one of the input content streams 502 available at the receiver 500. Audio from such a channel may be presented to the user as well.

In another example, alternate audio content may be provided via one of the other media content streams 502 not currently being presented to the user. In one scenario, the audio may be provided via a music channel either chosen at random or previously selected by the user via a menu system supplied by the receiver 500.

In addition to the segment specifically selected by the user, other segments related in some fashion to the user-selected segment may also be blocked upon user request. For example, if a commercial has been selected for blocking, the user may also request that other commercials for the same product or service, or commercials produced by the same provider of that product or service, may also be excluded from presentation. Similarly, other products of that same type regardless of the corporate entity involved may also be blocked. To this end, the control circuitry 512 may analyze any closed captioning data or other metadata accompanying or associated with the selected segment, and then compare the metadata with that of other portions of the input media content stream 502 to discover other segments that may be blocked.

For example, if a selected segment may be identified by metadata text identifying a particular product, service, type of product or service, or corporate entity, that same text may then be searched in other portions of the stream 502 to identify and block segments containing that text. Such text may or may not constitute the segment identification information 530 employed above to identify the user-selected segment; instead, the text used to identify other segments to be blocked may be extracted or derived from other closed captioning text supplied within the user-selected segment.

In other embodiments, forms of metadata other than closed captioning data may be employed in the media content stream 502 to block related segments from being presented in the output media content stream 504. In the case of a user-selected commercial, such metadata may explicitly define various aspects of the commercial, such as the product or service being advertised, the product or service provider for the product, as so on.

Many of the functional aspects associated with the control circuitry 516 may be guided by way of user options provided by way of user input 522 through the user interface 514. In one implementation, the user may access a set of menu options provided by the control circuitry 516 via the content output interface 512 to allow the user to set the scope of content to block, such as only the user-selected segment, other segments related to the segment, segments associated with product or service providers of the user-selected segment, and the like. Also, the user may select the type of alternate content, such as a barker or music channel, to use as a replacement of the blocked segment. The control circuitry 516 may also provide a list of the segments currently being blocked, along with an option to allow those segments to be presented via the content output interface 512.

Figure 6:
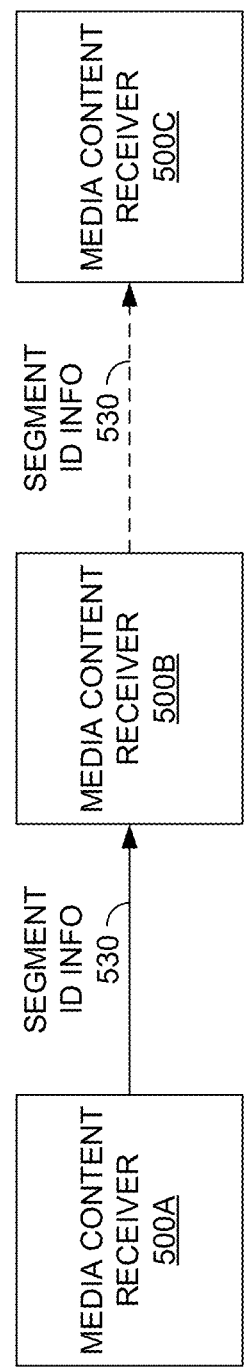
FIG. 6 is a block diagram of multiple media content receivers as shown in FIG. 5 configured to transfer media content segment identification information among the receivers according to an embodiment of the invention.

FIG. 6 is a block diagram of multiple media content receivers 500A, 500B, 500C communicatively coupled together, such as by way of an Ethernet, Wi-Fi, or Home-Plug® network often found in a home or business environment. To allow a single commercial or other segment to be blocked on multiple receivers 500, segment identification information 530 generated on the first media content receiver 500A may be forwarded by way of its communication interface 520 to a second receiver 500B so that the user-selected segment may be blocked from presentation on both the first receiver 500A and the second receiver 500B without the user being required to issue the user selection of the segment separately on the second receiver 500B. Further, the second receiver 500B may forward that same information 530 to a third media content receiver 500C so that any receiver 500 networked to the first receiver 500A may receive the segment information 530, thus allowing the user to specify or select the segment to be blocked only once while having that segment blocked on each receiver 500 associated with the user.

Figure 7:
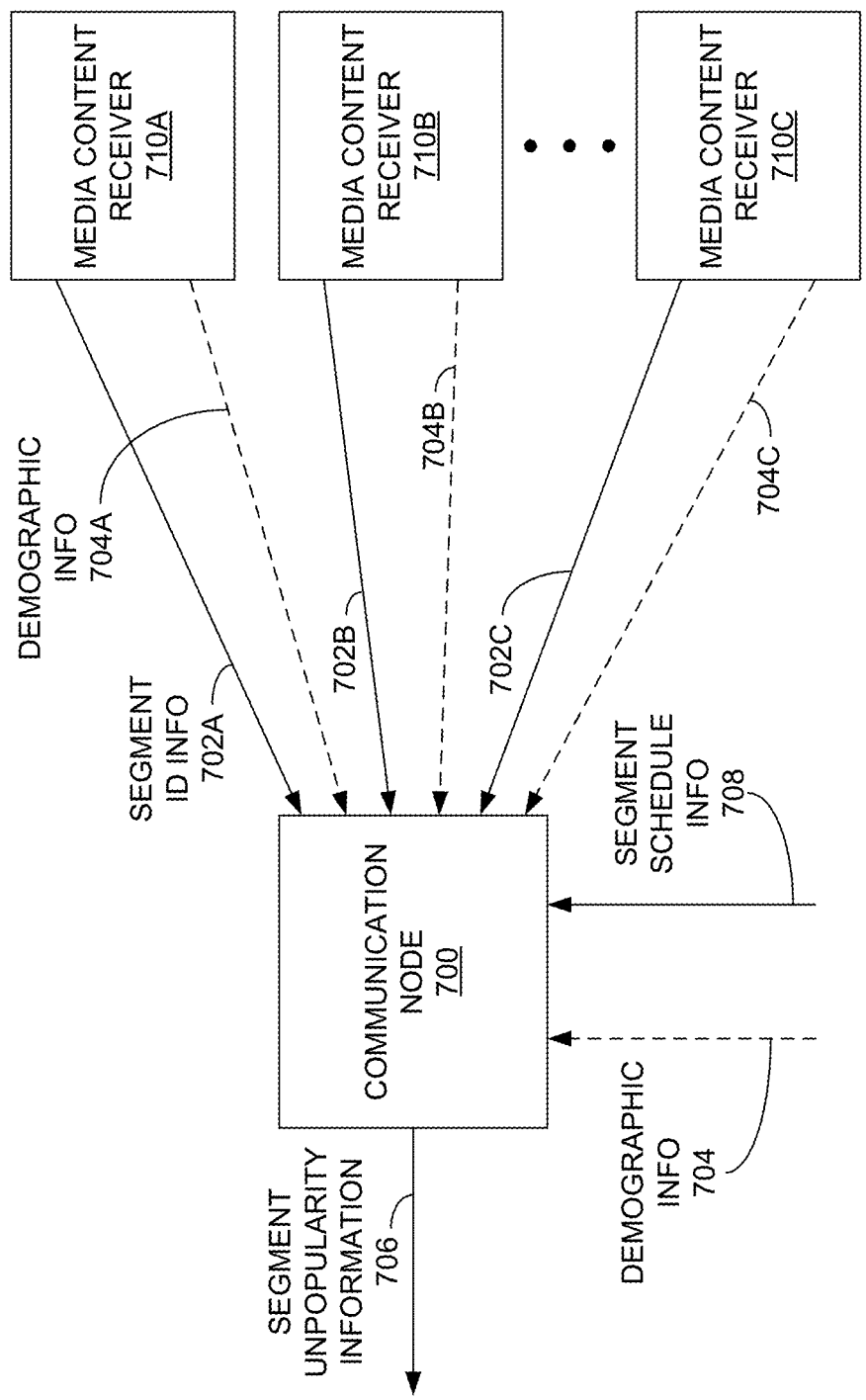
FIG. 7 is a block diagram of multiple media content receivers configured to provide media content segment identification information to a communication node according to an embodiment of the invention.

In addition to the segment identification information 530 required to identify a content segment for blocking purposes, a media content receiver may also generate a second type of segment content information for use by a third party. As shown in FIG. 7, multiple media content receivers 710A, 710B, 710C may be configured to transmit segment identification information 702A, 702B, 702C, respectively, to a communication node or server 700. Such communication may occur via a communication interface of each receiver 710A, such as the communication interface 520 of the receiver 500 of FIG. 5. In this example, the segment identification information 702 may provide an indication of a segment by way of specifying a channel number identifying a particular media content stream 502, along with a particular date and time associated with a segment selected by a user for blocking. Each receiver 710A, 710B, 710C may also provide demographic information 704A, 704B, 704C, respectively, possibly reflecting various characteristics of the user associated with the receiver 710, such as age, gender, and the like.

In response to collecting the segment identification information 702, and possibly the demographic information 704, the communication node 700 may generate segment unpopularity information 706 and transmit the information 706 to third parties, such as advertisers of products and services portrayed in commercials available in content streams 502 received by the receivers 710.

Figure 8:
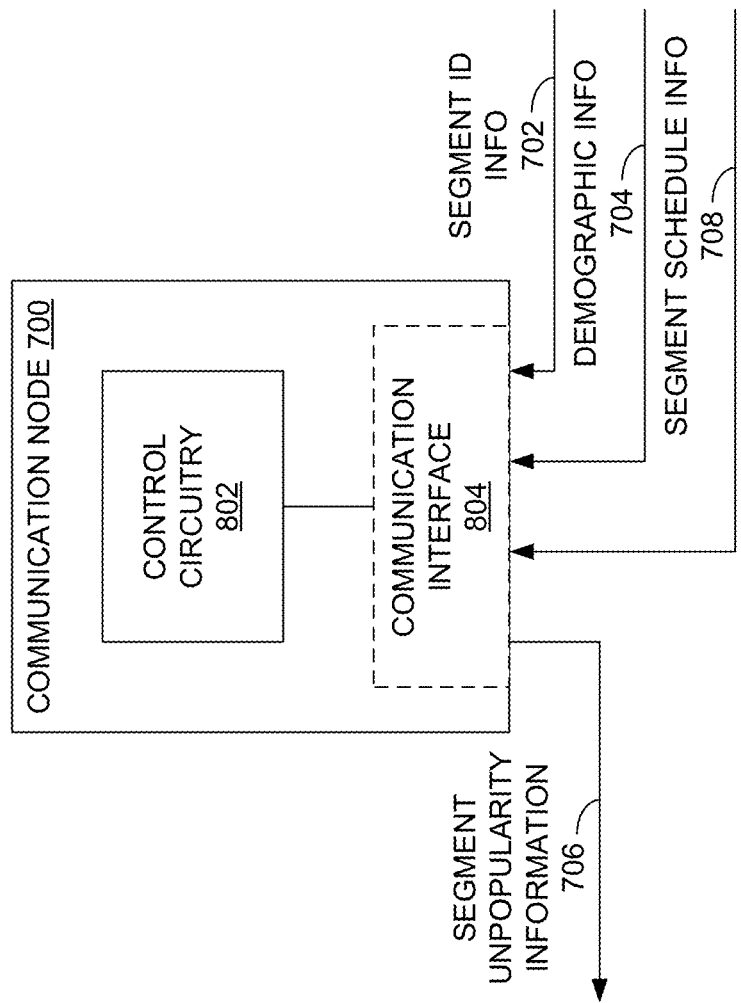
FIG. 8 is a block diagram of the communication node of FIG. 7 according to an embodiment of the invention.

As shown in greater detail in FIG. 8, the communication server or node 700 includes control circuitry 802 and a communication interface 804, which may be similar in functionality to the control circuitry 516 and the communication interface 520 of the receiver 500 of FIG. 5. Other components, such as a user interface, power supply, and the like, may also be included in the communication node 700 but are not discussed further herein. Generally, the communication interface 804 receives the segment identification information 702, and possibly user demographic information 704, from the receivers 500. In another example, the communication interface 804 receives the demographic information 704 from another source, such as a content subscriber database maintained by the service provider of the various content streams 502 that may be received at the receivers 710. The communication interface 804 may also receive segment scheduling information 708 relating the particular stream 502 or channel, and broadcast date and time, of various segments, such as programs, commercials, and the like, to some identifying information for each of the segments, such as the product, service, or corporate entity involved.

Based on the information received at the communication node 700, the control circuitry 802 of the node 700 may generate segment unpopularity information 706, which provides an indication as to which segments are being blocked the most, and also may associate the blocked segments with specific demographic viewer groups. In the case of commercial segments, such information 706 may be desired by product manufacturers, service providers, marketing firms, and so on to determine which commercials or advertisements are less popular.

At least some of the embodiments presented above allow a user of a media content receiver, such as a satellite, cable, or terrestrial set-top box, to block or prevent the presentation of one or more media content segments, such as television commercials, at each showing of the segment in response to a single user indication to block the currently-presented segment. The selected segment may be edited out of the media content stream carrying the segment, or may be replaced with alternate audio and/or video content less objectionable to the user. Furthermore, information identifying the segment to be blocked may be forwarded to other receivers for blocking purposes, as well as to a more centralized communication node configured to aggregate such information from multiple receivers and process the information to generate an indication of the relative unpopularity of the segment.

While several embodiments of the invention have been discussed herein, other implementations encompassed by the scope of the invention are possible. For example, while various embodiments have been described largely within the context of television set-top boxes, the design of other types of media content receivers, such as satellite and terrestrial radios, standalone DVRs, cellular telephones, PDAs, and desktop and laptop computers, that are capable of receiving media content streams with commercials and other contiguous identifiable content segments may employ various aspects of the systems and methods described above to similar effect. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of blocking user-selected media content, the method comprising:
communicating a stream of media content from a media device to a display of a media presentation device, wherein the stream of media content comprises a sequential series of a plurality of segments that are presentable in sequence on the display to a user, wherein the sequential series of segments of the stream of media content comprises a plurality of first segments that are program content that is of interest to the user,
wherein the program content corresponds to one of a movie, an entertainment series episode, a news program, or a sporting event,
wherein the sequential series of segments of the stream of media content further comprises a plurality of second segments that are not associated with the program content, and
wherein the plurality of second segments correspond to one of an advertisement or a commercial;
receiving a command from the user to block a currently presented second segment that is one of the plurality of second segments from at least future presentation from the media device;
generating information that identifies the blocked second segment;
continuously analyzing the stream of media content to detect a later occurrence of the blocked second segment; and
preventing presentation of the detected later occurrence of the blocked second segment.

2. The method of claim 1, further comprising:
communicating a replacement segment of media content from the media device to the display during the blocking of the detected later occurrence of the blocked second segment.

3. The method of claim 2, wherein the replacement segment of media content is a replacement advertisement that is different from an advertisement of the detected later occurrence of the blocked second segment.

4. The method of claim 2, wherein the replacement segment of media content is replacement program content that corresponds to one of a different movie, a different entertainment series episode, a different news program, or a different sporting event.

5. The method of claim 1, wherein the continuously analyzing the stream of media content further comprises:
analyzing the stream of media content to detect a beginning of the later occurrence of the blocked second segment, wherein the replacement segment is then presented;
continuously analyzing the stream of media content to detect an end of the later occurrence of the blocked second segment; and
resuming presentation of the stream of media content in response to detecting the end of the detected later occurrence of the blocked second segment.

6. The method of claim 1, further comprising:
preventing presentation of a remaining portion of the second segment in response to receiving the command from the user to block a currently presented second segment;
continuously analyzing the stream of media content to detect an end of the second segment; and
resuming communication of the stream of media content in response to detecting the end of the second segment.

7. The method of claim 1, wherein the currently presented second segment corresponds to a product or service of a corporate entity, the method further comprising:
continuously analyzing the stream of media content to detect a later occurrence of another second segment that is associated with the corporate entity; and
preventing presentation of the detected later occurrence of the other second segment.

8. The method of claim 7, wherein the corporate entity is a first corporate entity, and wherein the currently presented second segment corresponds to a product or service of a first corporate entity, the method further comprising:

continuously analyzing the stream of media content to detect a later occurrence of another second segment associated with a different second corporate entity, wherein the other second segment is similar to the product or service of the first corporate entity; and preventing presentation of the detected later occurrence of the other second segment.

9. The method of claim 1, wherein the currently presented second segment corresponds to a first product or first service of a corporate entity, the method further comprising:

continuously analyzing the stream of media content to detect a later occurrence of another second segment associated with a second product or second service of the corporate entity, wherein the second product or second service of the other second segment is unrelated to the first product or first service of the corporate entity; and preventing presentation of the detected later occurrence of the other second segment.

10. The method of claim 1, wherein generating the information that identifies the blocked second segment comprises:

identifying first metadata of the blocked second segment;

continuously analyzing metadata in the stream of media content; and detecting a later occurrence of second metadata that corresponds to the first metadata, wherein the later occurrence of the blocked second segment is based on the detected second metadata.

11. The method of claim 1, wherein generating the information that identifies the blocked second segment comprises:

identifying first metadata of the blocked second segment, wherein the first metadata corresponds to a first aspect of the blocked second segment;

continuously analyzing metadata in the stream of media content; and detecting a later occurrence of second metadata that has a second aspect, wherein the second aspect is similar to the first aspect of the first metadata, wherein the later occurrence of the blocked second segment is based on the second aspect of the detected second metadata.

12. The method of claim 1, wherein generating the information that identifies the blocked second segment comprises:

identifying a unique text in closed captioning data of the blocked second segment;

continuously analyzing closed captioning data in the stream of media content; and detecting a later occurrence of the unique text in closed captioning data, wherein the later occurrence of the blocked second segment is based on the detected unique text in closed captioning data.

13. The method of claim 1, wherein generating the information that identifies the blocked second segment comprises:

identifying a predefined number of dark frames in a video portion of the stream of media content that precedes the blocked second segment;

continuously analyzing the video portion of the stream of media content; and detecting a later occurrence of the predefined number of dark frames in the video portion of the stream of media content, wherein the later occurrence of the blocked second segment is based on the detected predefined number of dark frames.

14. The method of claim 1, wherein generating the information that identifies the blocked second segment comprises:

identifying a change in resolution from a high definition to a standard definition in a video portion of the stream of media content that corresponds to a transition between a preceding one of the plurality of first segments and the blocked second segment;

continuously analyzing video portion of the stream of media content; and detecting a later occurrence of the change in resolution from the high definition to the standard definition in the video portion of the stream of media content, wherein the later occurrence of the blocked second segment is based on the detected change in resolution.

15. The method of claim 1, wherein generating the information that identifies the blocked second segment comprises:

identifying a change in a format of audio sample information in an audio portion of the stream of media content that corresponds to a transition between a preceding one of the plurality of first segments and the blocked second segment;

continuously analyzing video portion of the stream of media content; and detecting a later occurrence of the change in the format of the audio sample information in the audio portion of the stream of media content, wherein the later occurrence of the blocked second segment is based on the detected change in the format of audio sample information.

16. The method of claim 1, further comprising:

buffering the stream of media content for at least as long as is required to generate the information that identifies the blocked second segment and to detect the later occurrence of the blocked second segment, wherein the stream of media content is then communicated from the media device to the display after buffering.

17. A method of blocking user-selected media content, the method comprising:

communicating a stream of media content from a media device to a display of a media presentation device, wherein the stream of media content comprises a sequential series of program segments and a plurality of advertisements that are presentable on the display to a user, wherein the wherein the sequential series of program segments of the stream of media content is program content that is of interest to the user, and wherein the program content corresponds to one of a movie, an entertainment series episode, a news program, or a sporting event;

receiving a command from the user to block a currently presented advertisement from at least future communication from the media device;

generating information that identifies the blocked advertisement;

continuously analyzing the stream of media content to identify a later occurrence of the advertisement; and preventing communication of the detected later occurrence of the advertisement from the media device.

18. A media content receiver, comprising:
a content input interface configured to receive multiple channels of media content from a media content source,
wherein each of the channels carries a media content stream defined by a plurality of contiguous sequential series of a plurality of segments of media content,
wherein the sequential series of segments of the stream of media content comprises a plurality of first segments that are program content that is of interest to the user,
wherein the program content corresponds to one of a movie, an entertainment series episode, a news program, or a sporting event,
wherein the sequential series of segments of the stream of media content further comprises a plurality of second segments that are not associated with the program content, and
wherein the plurality of second segments correspond to one of an advertisement or a commercial;
a content output interface configured to transmit the contiguous sequential series of a plurality of the first segments and the second segments to a display of a media presentation device, wherein the contiguous segments of media content that are presentable in sequence on the display to a user;
a user interface configured to receive a user command from the user during a currently presented second segment of media content, wherein the user command is to prevent subsequent showings of the currently presented second segment of media content; and
control circuitry configured to:
generate identifying information that identifies the currently presented second segment that is to be blocked;
compare identifying information of a later received second segment of the media content stream with the identifying information of the currently presented second segment; and
prevent presentation of at least one of the later received second segments that have the same identifying information as the identifying information of the currently presented second segment.

19. The media content receiver of claim 18, wherein the second segment is associated with one of a product or service, or wherein the second segment is associated a corporate entity is the same for the later received advertisement and the blocked advertisement.

* * * * *